(12) United States Patent
Fields

(10) Patent No.: US 12,034,294 B2
(45) Date of Patent: Jul. 9, 2024

(54) SYSTEM, SERVER AND METHOD FOR MONITORING UTILITY SYSTEMS

(71) Applicant: PACIFIC GAS AND ELECTRIC COMPANY, San Francisco, CA (US)

(72) Inventor: Richard Fields, Oakland, CA (US)

(73) Assignee: PACIFIC GAS AND ELECTRIC COMPANY, Oakland, CA (US)

( * ) Notice: Subject to any disclaimer, the term of this patent is extended or adjusted under 35 U.S.C. 154(b) by 694 days.

(21) Appl. No.: 17/137,848

(22) Filed: Dec. 30, 2020

(65) Prior Publication Data

US 2021/0203151 A1 Jul. 1, 2021

Related U.S. Application Data

(60) Provisional application No. 62/955,109, filed on Dec. 30, 2019.

(51) Int. Cl.
| | |
|---|---|
| *H02H 7/26* | (2006.01) |
| *G01J 5/00* | (2022.01) |
| *G06T 7/246* | (2017.01) |
| *H02H 3/04* | (2006.01) |
| *H02H 5/04* | (2006.01) |
| *H02H 5/12* | (2006.01) |
| *G08B 25/06* | (2006.01) |

(52) U.S. Cl.
CPC ............ *H02H 7/261* (2013.01); *G01J 5/0096* (2013.01); *G06T 7/248* (2017.01); *H02H 3/04* (2013.01); *H02H 5/046* (2013.01); *H02H 5/12* (2013.01); *G08B 25/06* (2013.01)

(58) Field of Classification Search
CPC .......... H02H 7/261; H02H 3/04; H02H 5/046; H02H 5/12; G06T 7/248; G01J 5/0096

USPC ......................................................... 340/635
See application file for complete search history.

(56) References Cited

U.S. PATENT DOCUMENTS

| | | | |
|---|---|---|---|
| 9,501,930 B2 | 11/2016 | Smith et al. | |
| 2007/0059059 A1* | 3/2007 | Fujino ................ | G03G 15/205 |
| | | | 399/329 |

(Continued)

FOREIGN PATENT DOCUMENTS

KR 10-2018-0060039 A 6/2018

OTHER PUBLICATIONS

Korean Intellectual Property Office, International Search Report and Written Opinion for International Patent Application No. PCT/US2020/067450, dated Apr. 20, 2021, 9 pages, Republic of Korea.

*Primary Examiner* — Kerri L McNally
(74) *Attorney, Agent, or Firm* — Greenberg Traurig, LLP

(57) ABSTRACT

The disclosure describes a system for monitoring and mitigating damage to electrical utility structures and the surrounding environment. In some embodiments, the system includes fire boxes, arc sensors, angle switches, and disconnect switches configured to generate alert signals when a hazard is detected. In some embodiments, the system includes cameras configured to detect a hazard such as a fire or moving object. In some embodiments, the system includes light transmitters and light receivers positioned at a predetermined location away from power lines to detect objects that interrupt a line of site. In some embodiments, the system can electrically isolate a power line before a detected hazard impacts a power line.

15 Claims, 10 Drawing Sheets

(56) References Cited

U.S. PATENT DOCUMENTS

| | | | | |
|---|---|---|---|---|
| 2010/0033345 | A1* | 2/2010 | Polk | H04Q 9/00 340/870.01 |
| 2012/0046799 | A1* | 2/2012 | Alex | G01R 15/142 700/298 |
| 2013/0191066 | A1* | 7/2013 | Spillane | H02G 1/02 702/135 |
| 2013/0278423 | A1* | 10/2013 | Chen | G08B 13/183 340/556 |
| 2014/0278150 | A1* | 9/2014 | Baesler | E04H 12/00 702/34 |
| 2015/0364944 | A1* | 12/2015 | Garcia Briz | H02J 50/60 307/104 |
| 2016/0148499 | A1* | 5/2016 | Hicks, III | H04L 12/6418 340/506 |
| 2017/0027157 | A1* | 2/2017 | Purpura | A01K 15/021 |
| 2019/0302143 | A1* | 10/2019 | Katzir | F16B 1/00 |
| 2020/0098513 | A1* | 3/2020 | Zhang | H01F 27/02 |

* cited by examiner

SYSTEM, SERVER AND METHOD FOR MONITORING UTILITY SYSTEMS

CROSS REFERENCE TO RELATED APPLICATIONS

This application claims the benefit of U.S. Provisional Patent Application No. 62/955,109, filed Dec. 30, 2019, the entire contents of which are incorporated by reference herein.

BACKGROUND

Electricity is often distributed or transmitted through a network of power lines that are supported by several towers. Fires, gusty winds, and other environmental factors may damage or otherwise negatively affect one or more towers or power lines leading to damaged or weakened energized power lines that may cause damage to the nearby environment. As a safety precaution, a utility company may proactively de-energize power lines, e.g., by instituting a public safety power shutoff (PSPS) to reduce the risk from environmental factors damaging or weakening towers or power lines. PSPS may lead to power outages that last for several days but are necessary to for public safety. Current approaches to addressing the effects of environmental factors on a power line network can place significant burdens on customers or users in the interest of enhancing public safety. References to towers can comprise, towers, poles, and any other suitable support structure(s).

SUMMARY

In some embodiments, a utility structure monitoring system including one or more sensors, one or more utility power lines, and/or one or more utility structures. In some embodiments, the one or more sensors are configured to detect a hazard at a predetermined distance from the one or more utility power lines and generate a hazard signal. In some embodiments, the utility structure monitoring system is configured to generate a hazard alert upon receiving the hazard signal generated by the one or more sensors.

In some embodiments, the one or more sensors includes one or more light emitting elements configured to transmit a light signal, and one or more light receiving elements each configured to receive the light signal from a respective one of the one or more light emitting elements. In some embodiments, each of the one or more light receiving elements receives the light signal from respective one of the one or more light emitting element along a line of site.

In some embodiments, the one or more sensors includes a laser sensor. In some embodiments, the laser sensor includes one or more of a through-beam sensor, retro-reflective sensor, and a diffuse reflection sensor. In some embodiments, the one or more sensors includes a photoelectric sensor.

In some embodiments, the one or more sensors includes one or more cameras. In some embodiments, the utility structure monitoring system is configured to generate a hazard alert upon detecting one or more moving objects within a field of view at least one of the one or more cameras. In some embodiments, the one or more cameras include one or more thermal cameras. In some embodiments, the utility structure monitoring system is configured to generate an alert upon detecting a temperature above a predetermined limit using the one or more thermal cameras.

In some embodiments, the one or more sensors includes one or more thermocouples. In some embodiments, the utility structure monitoring system is configured to generate an alert upon detecting a temperature above a predetermined limit using the one or more thermocouples.

In some embodiments, the one or more sensors includes one or more angle switches. In some embodiments, the one or more angle switches are configured to generate the hazard signal in response to the one or more utility structures shifting beyond a predetermined angle.

In some embodiments, utility structure monitoring system includes one or more sensors, one or more utility power lines configured to conduct more than 1000 volts of electricity, and one or more utility structures configured to suspend the one or more utility power lines at a predetermined vertical distance from a ground base of the one or more utility structures. In some embodiments, the one or more sensors are configured to detect a hazard to the one or more utility power lines and generate a hazard signal. In some embodiments, the utility structure monitoring system is configured to generate a hazard alert action upon receiving the hazard signal generated by the one or more sensors. In some embodiments, the hazard includes one or more of a utility structure position shift, a line of sight break, an electrical arc, and a fire.

In some embodiments, the system further includes a fire box. In some embodiments, the one or more sensors includes an arc sensor configured to generate the hazard signal in response to an arc emanating from the one or more utility power lines. In some embodiments, the fire box is configured to prevent a fire by containing the arc emanating from the one or more utility power lines.

In some embodiments, the one or more sensors includes one or more light emitting elements and one or more light receiving elements. In some embodiments, the one or more light receiving elements are each configured to receive a light signal from a respective one of the one or more light emitting elements along a line of site. In some embodiments, the utility structure monitoring system is configured to generate the hazard alert action in response to an object passing between the one or more light receiving elements and respective one of the one or more light emitting elements thereby breaking the respective line of site. In some embodiments, the one or more light emitting elements and one or more light receiving elements are each positioned such that the line of sight extends at a predetermined distance away from the one or more utility power lines.

In some embodiments, in addition to the one or more light emitting elements and one or more light receiving elements, the one or more sensors include. one or more cameras. In some embodiments, the utility structure monitoring system is configured to generate the hazard alert action upon detecting the object within a field of view at least one of the one or more cameras and/or upon detecting a fire within a field of view at least one of the one or more cameras.

In some embodiments, the one or more sensors includes one or more angle switches configured to generate the hazard signal in response to the one or more utility structures shifting beyond a predetermined angle. In some embodiments, the one or more sensors includes one or more disconnect switches. In some embodiments, the one or more disconnect switches are configured to generate a hazard signal upon at least a portion the utility structure including an insulator, an insulator hook, and/or the one or more power lines, move from a fixed position. In some embodiments, moving from a fixed position causes at least a portion of the one or more disconnect switches to electrically decouple from a sensor connection. In some embodiments, the angle switch includes the disconnect switch. In some embodiments, the angle switch is configured to electrically decouple in response to at least a portion of the one or more utility structures and/or one or more power lines shifting from a fixed position.

DETAILED DESCRIPTION

Figure 1:
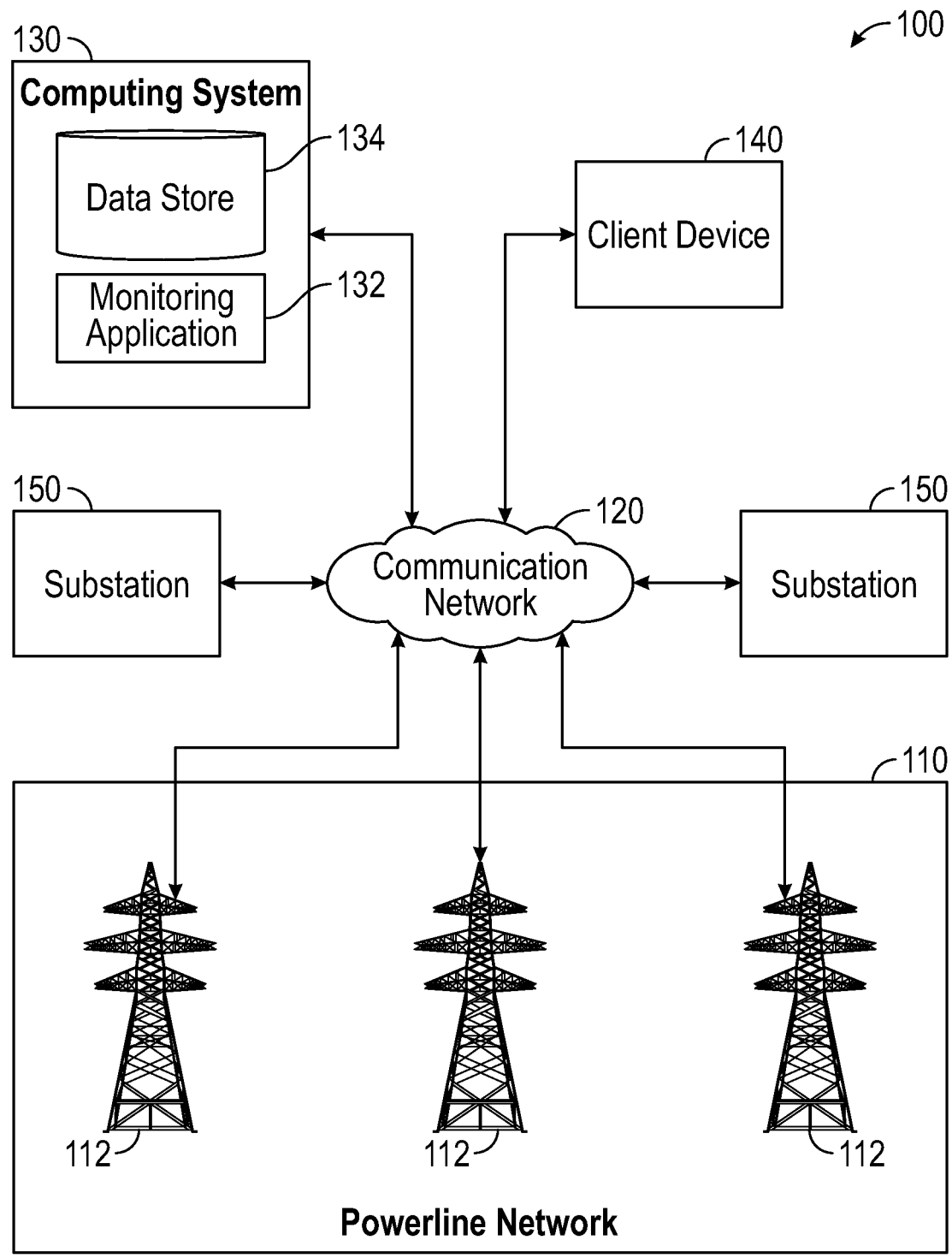
FIG. 1 is a drawing of an operating environment according to various embodiments.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily-apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives that fall within the scope of embodiments of the invention.

As used herein, a "user" can be a single user or a plurality of users using a power line resource. Further, a user can be defined as a member of the public, and/or the creator, and/or a consumer, and/or a customer, and/or a client, or an entity such as a limited liability company. Other user types can include, but not be limited to, an administrative user and/or a system user. The user can comprise a mobile user engaging the platform.

Embodiments of the invention described herein generally recite non-conventional approaches for monitoring, detecting, analyzing, responding to, and remediating environmental issues affecting power lines or power line towers. Moreover, the specific functional features are a significant technological improvement over conventional methods and systems, including at least the operation and functioning of a computing system that are technological improvements. This technological improvement includes the one or more aspects of the systems and method described herein that describe the specifics of how mechanical structures operate, which the Federal Circuit makes clear is the essence of statutory subject matter.

The description herein further describes some embodiments that provide novel features that improve the performance of communication and software, systems and servers by providing automated functionality that effectively and more efficiently manage sensor data, generate communications, and arrange various components. Therefore, the person of ordinary skill can easily recognize that these functions provide the automated functionality, as described herein, in a manner that is not well-known and certainly not conventional. As such, the embodiments of the invention described herein are not directed to an abstract idea and further provide significantly more tangible innovation. Moreover, the functionalities described herein were not imaginable in previously-existing computing systems, and did not exist until some embodiments of the invention solved the technical problem described earlier.

In some embodiments, a power line tower (i.e., utility structure) is configured to be equipped with one or more sensors for detecting proximate objects such as, for example, defective jumper cables, overgrown vegetation, natural conditions (e.g., fires, smoke, etc.), broken switches, and the like. In some embodiments, the tower includes components that configured to generate an electronic message for transmission over any type of communication network to a server. In some embodiments, the server is configured to analyze messages originating from one or more towers to determine if remediation or response is necessary.

In some embodiments, a tower comprises one or more cameras. In some embodiments, the camera are configured to be remotely controlled by a client device. For example, a user can pivot or otherwise control the directional orientation of the camera remotely over a communication network according to some embodiments. In some embodiments, the camera can begin to automatically record or capture image data in response to a predetermined condition. In some embodiments, the predetermined condition can be the identification of a proximate object.

In some embodiments, a plurality of power line towers are configured to include sensors that are configured to detect whether an object breaks a line of sight. For example, the sensors can comprise one or more lasers used to establish an optical path, which, when broken, triggers a message to be transmitted over a communication network.

In some embodiments, lasers are arranged to create a shield of coverage to detect intruding objects that penetrate the shield of coverage. In some embodiments, lasers that project a planar light beam and corresponding laser sensors or detectors can be used. In some embodiments, the shield of coverage is positioned around a tower and/or around a power line. In some embodiments, a support structure is used to position the plurality of lasers within a predetermined distance around the tower. In some embodiments, lasers are configured to monitor a range that extends tower-to-tower. In some embodiments, the system is configured to where a breaking of a light beam triggers notification and/or detection of an intrusive object or natural occurrence. In some embodiments, remedial action is initiated by the system based on the sensor data. In some embodiments, the system is configured to determine a location of a defect so that remedial action can be taken quickly and efficiently.

In some embodiments, the system includes a cloud-based monitoring application configured to monitor sensor data originating from a plurality of towers. In some embodiments, the monitoring application is configured to provide real-time monitoring of a power line network. In some embodiments, the monitoring application is configured to provide the location of a potential contact with a tower. In some embodiments, the monitoring application identifies a power line condition such as, for example, a sagging power line, a downed power line, a failed jumper cable, etc. In some embodiments, the monitoring application is configured to detect an object or environmental condition such as, for example, smoke or fire near a tower or power line.

In some embodiments, the monitoring application is configured to analyze sensor data to determine whether an object is obstructing a tower or whether a tower is damaged. Objects may be, for just one, non-limiting example, mylar balloons or large birds according to some embodiments. Such objects may break the laser light beam, signaling that an object is proximate to the tower. In response to a broken laser beam, a message is sent from a sensor to the monitoring application according to some embodiments. In some embodiments, the monitoring application is configured to de-energize a power line supported by the tower before the object makes contact with the tower or power line. In some embodiments, visual data provided by a camera mounted on the tower is captured and automatically displayed by the system so that a user may assess whether an object proximate to the tower or power line poses a significant threat.

In some embodiments, the monitoring application is configured to analyze sensor data to determine whether an object is obstructing a tower or whether a tower is damaged. For example, in some embodiments, the monitoring application is configured to analyze a signature or pattern associated with the sensor data to determine the nature of the obstruction. For example, the monitoring application is configured to detect the duration of the breakage of the laser beam or the frequency of the breakage of the laser beam (and/or array of laser beams) to determine whether the object is moving or relatively stationary according to some embodiments.

Some embodiments are directed to supporting Public Safety Power Shutoffs (PSPS) events. During a PSPS event, circuits identified as having elevated risk may be proactively de-energized in the interest of public safety according to some embodiments. In some embodiments, when relevant environmental conditions subside, the sensor systems attached or otherwise coupled to towers is configured to determine whether particular towers have clear spans and present a low risk of potential damage. For example, in some embodiments, the system is configured to use sensors such as lasers or cameras to confirm that no objects are proximate to the tower or power line, thereby eliminating or lessening the need to send inspectors and aircraft, which saves cost. Accordingly, a power line associated with a tower having a clear span may be quickly re-energized according to some embodiments. In some embodiments, this may lead to expedited inspections and reenergizing during or after PSPS events. In some embodiments, outside of PSPS events, at least a portion of the laser detection and coverage system is configured to be activated to remotely monitor power lines. Thus, the monitoring application is configured to identify real-time line damage, assist in prioritizing enhanced vegetation management work, and support preventive maintenance and routine inspection of assets according to some embodiments.

In some embodiments, the monitoring application is configured to receive a message comprising a binary detection signal from a sensor mounted on the tower. In some embodiments, the binary detection signal may be generated in response to a broken laser beam. In some embodiments, each message is time stamped and recorded in a data store for audit and traceability.

In some embodiments, one or more cameras are mounted on a tower and used to assist in re-energization decision making. In some embodiments, camera output and/or reception is enabled in response to detecting a break in the laser beam. In some embodiments, the system is configured to deliver camera footage to users via fiber optics or any conventional communication technology. For example, a user may access camera footage using a client device connected over the communication network according to some embodiments. Accordingly, in some embodiments, users are able to review camera in real-time to dispatch appropriate crews for remediation.

In some embodiments, the arrangement of sensors and/or cameras on towers coupled to a communication network provide a variety of benefits. These benefits may be, for example, intelligent shutdown in response to detecting proximate object, real-time traceability, prioritized remediation work, real-time visual data, power line sag detection, downed pole or power line detection, object detection, long range detection, detection speed, fire/smoke detection, jumper or hook failure detection, aviation detection, determination of the location of a potential object near a power line tower, status monitoring, and sensors that operate continuously in daytime and nighttime according to some embodiments.

In some embodiments, the monitoring application is configured to automatically perform remediation in response to a laser beam breakage event. For example, in some embodiments, the monitoring application may de-energize one or more power lines supported by towers associated with the laser beam breakage. In addition, in some embodiments, the monitoring application is configured to generate one or more instructions to rebalance the power grid so that energy customers experience no impact or limited impact due to the de-energized line.

Various embodiments provide advantages over prior art systems. For example, some embodiments allow for the detection and remediation of objects making contact with energized lines. Some embodiments provide rapid de-energization of power lines prior to fire ignition and fast network-energy re-balancing. Some embodiments allow for visibility of detection with pinpoint location of potential proximate objects. Some embodiments permit improved vegetation management near power lines. Some embodiments improve the customer experience from planned power shut offs. Some embodiments enable reduced outage restoration times and risk to life or property. Some embodiments provide real-time monitoring with pinpoint-location detection of fire risks.

FIG. 1 shows an operating environment 100 according to some embodiments. In some embodiments, the operating environment 100 includes a power line network 110. In some embodiments, the power line network 110 is made up of one or more towers 112. In some embodiments, each tower 112 includes a large vertical structure designed to carry a power line above ground. In some embodiments, a tower 112 may be a transmission tower, a distribution tower, or any other conventional tower that supports an energized power line. In some embodiments, a tower 112 may be a large steel structure used to distribute the power lines of an energy grid over a large geographic area. In some embodiments, power lines supported by several towers 112 form the power line network 110. A tower 112 may also be considered a power pole according to some embodiments.

In some embodiments, each tower 112 is configured to communicate over a communication network 120. In some embodiments, the communication network 120 includes the Internet, intranets, extranets, wide area networks (WANs), local area networks (LANs), fiber optic network, radio frequency network, cellular networks, wired networks, wireless networks, or other suitable conventional networks, or any combination of networks. In some embodiments, endpoints such as, for example, a tower 112, are configured to communicate over the communication network 120 through fiber optic modules, wireless radio modules, cellular communication modules, and other components that facilitate electronic communication over a geographic region.

In some embodiments, the operating environment 100 includes a computing system 130. In some embodiments, a computing system 130 includes a combination of hardware and software. In some embodiments, the computing system 130 includes software programs that may execute in the computing system 130 such as, for example, a monitoring application 132. In some embodiments, the computing system 130 includes a data store 134. In some embodiments, the computing system 130 is configured to be connected to the communication network 120 as an endpoint.

In some embodiments, the computing system 130 may comprise, for example, a server computer or any other conventional system providing computing capability. Alternatively, in some embodiments, the computing system 130 is configured to employ a plurality of computing devices that are configured to be arranged, for example, in one or more server banks or computer banks or other arrangements. In some embodiments, the computing devices are located in a single installation or are distributed among many different geographical locations. For example, the computing system 130 may include a plurality of computing devices that together comprise a hosted computing resource, a grid computing resource and/or any other distributed computing arrangement according to some embodiments. In some embodiments, the computing system 130 may correspond to an elastic computing resource where the allotted capacity of processing, network, storage, or other computing-related resources is configured to vary over time. In some embodiments, the computing system 130 is configured to implement one or more virtual machines that use the resources of the computing system 130. In some embodiments, various software components may be executed on one or more virtual machines.

Various applications and/or other functionality may be executed in the computing system 130 according to various embodiments. In some embodiments, various data may be stored in the data store 134 or other memory that may be accessible to the computing system 130. In some embodiments, the data store 134 may represent one or more data stores 134. In some embodiments, the data store 134 includes a database. In some embodiments, the data store 134 is configured to store data processed or handled by the monitoring application 132 or data that is processed or handled by other applications executing in the computing system 130.

In some embodiments, the monitoring application 132 may include software that receives communication over the communication network 120. 160095-010402 the monitoring application 132 is configured to receive hazard signals originating from one or more towers 112 and/or one or more sensors 210. In some embodiments, the monitoring application 132 also is configured to receive video data originating from one or more cameras 215 on the one or more towers 112. In some embodiments, the monitoring application 132 is configured to process the data and transmit it over the communication network 120 to an appropriate endpoint. In some embodiments, the monitoring application 132 is configured to generate one or more instructions to de-energize a power line associated with a particular tower 112. In some embodiments, the monitoring application 132 is configured to generate one or more messages and transmit the messages to a client device or other endpoint over the communication network 120. In some embodiments, the monitoring application is configured to alert a particular client device that an object has been detected near a tower 112. The functionality of the monitoring application 132 is described in further detail below according to some embodiments.

In some embodiments, the operating environment 100 includes one or more client devices 140. In some embodiments, a client device 140 allows a user to interact with the components of the computing system 132 over the communication network 120. In some embodiments, a client device 140 may be, for example, a cell phone, laptop, personal computer, mobile device, or any other conventional computing device used by a user. In some embodiments, the client device 140 may be operated by a user and is configured to communicate with the monitoring application 132. For example, the client device 140 may receive alerts from the monitoring application 132 and may receive live data originating from one or more towers 112 according to some embodiments.

In some embodiments, the operating environment 100 may further include one or more substations 150. In some embodiments, a substation 150 includes a facility that is part of a power grid or an electrical generation, transmission, and distribution system. In some embodiments, substations 150 are configured to transform voltage from high to low, or the reverse, or perform other conversions. In some embodiments, electric power may flow through several substations 150 at varying voltage levels. In some embodiments, a substation 150 includes transformers to change voltage levels between high transmission voltages and lower distribution voltages, or at the interconnection of two different transmission voltages. In some embodiments, a substation 150 may be coupled to the power line network such that it helps facilitate the distribution of power across multiple power lines. In some embodiments, a substation 150 includes a communication module configured to communicate over the communication network 120. In this respect, the substation 120 may receive or send messages to other endpoints on the communication network 120 according to some embodiments.

In some embodiments, the substation 150 is configured to de-energize or reenergize a particular power line. In some embodiments, the substation 150 is configured to be controlled in part, by the monitoring application 132 or by user input received at a client device 140. For example, in some embodiments a substation 150 is configured to receive an instruction to energize/de-energize a particular power line associated with a specified tower 112. In some embodiments, the substation 150 is configured to receive an instruction to rebalance the power grid in response to a de-energized power line. In some embodiments, the substation 150 is configured to transmit messages pertaining to the status of a power line that was energized or de-energized. In some embodiments, the substation is configured to serve as an endpoint in the communication network 120.

Figure 2:
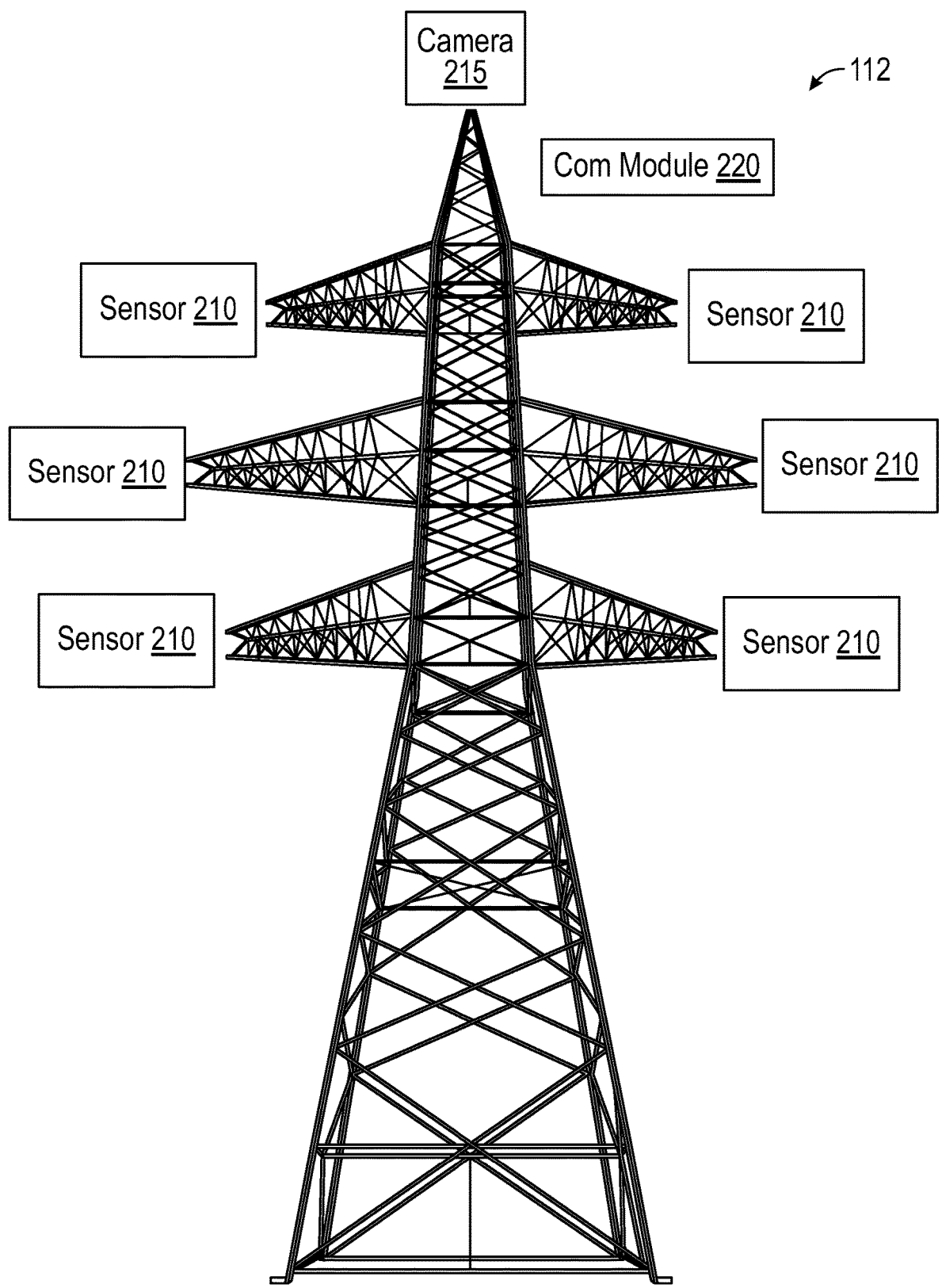
FIG. 2 shows the location of various sensors on an electrical utility tower according to some embodiments.

FIG. 2 is a drawing of a tower 112 implemented in the operating environment 100 according to various embodiments. In some embodiments, the tower 112 is configured to carry or support one or more power lines. In some embodiments, the tower 112 may comprise one or more sensors 210, one or more cameras 215, and a communication module 220.

In some embodiments, a sensor 210 may be a laser, an electromagnetic sensor, a LiDar, radar, a proximity sensor, or other sensor that detects the presence of nearby objects. In some embodiments, the sensor 210 comprises a laser that is configured to generate or receive a laser beam. For example, in some embodiments, the sensor 210 is configured to detect when an object crosses a beam such that the sensor is tripped or such that the beam is broken or interrupted. In some embodiments, a plurality of sensors 210 is installed around the periphery of the tower 112.

In some embodiments, a camera 215 is configured to be installed on the tower 112. In some embodiments, the camera 215 comprises an infrared sensor to detect images during nighttime. In some embodiments, the camera 215 can be stationary or can be attached to a moveable mount that is remotely controlled. In some embodiments, the camera can be configured to be turned on or off remotely and can provide a real-time video feed in response to commands received from a computing system 130 or client device 140. In some embodiments, the camera is configured to record and store video in response to a sensor being triggered.

In some embodiments, the tower 112 includes a disconnect switch configured to immediate shutoff power if at least a portion of a power line is separated from a utility structure such as tower 112. In some embodiments, if a tower 112 is leaning past a predetermined angle, the angle switch is configured to cut power to the tower 112. In some embodiments, the tower 112 also includes an accelerator switch configured to cut power to the tower 112 if at least a portion of the tower exceeds a predetermined acceleration (e.g., from being moved by wind, impact, and/or gravity). In some embodiments, the switches of a tower may be controlled remotely from signals received over the communication network 120. In some embodiments, the disconnect switch is configured to be pulled apart upon failure of the insulator, insulator hook, and/or power line. In some embodiments, when the disconnect switch exceeds a predetermined load it disconnects and opens a circuit which the system is configured to process as a failure event.

In some embodiments, a tower 112 (or any other utility structure such as a pole) includes two angle switches. In some embodiments, each angle switch is configured to trigger at different angles (e.g., 25° and 50°). In some embodiments, when a utility structure 112 has shifted to past a first angle (e.g., 25°) the system is configured to alert personnel in real-time and/or activate the camera system. In some embodiments, when the system receives a signal that a utility structure 112 has shifted past a second angle (e.g., 50°), the system is configured to send a signal to deenergize the utility structure 112 and activate the camera system.

In some embodiments, the tower 112 includes a communication module 220. In some embodiments, the communication module 220 is configured to enable components coupled to the tower 112 to communicate over the communication network 120. For example, various switches on the tower 112, the camera 215, and the sensors 210 may each be connected to the communication module 220 to allow various tower components to communicate over the communication network 120 according to some embodiments.

In some embodiments, the tower 112 comprises a tower identifier to identify the tower 112. In some embodiments, the tower further comprises a Global Positioning Satellite (GPS) module to determine location or timing data.

Figure 3:
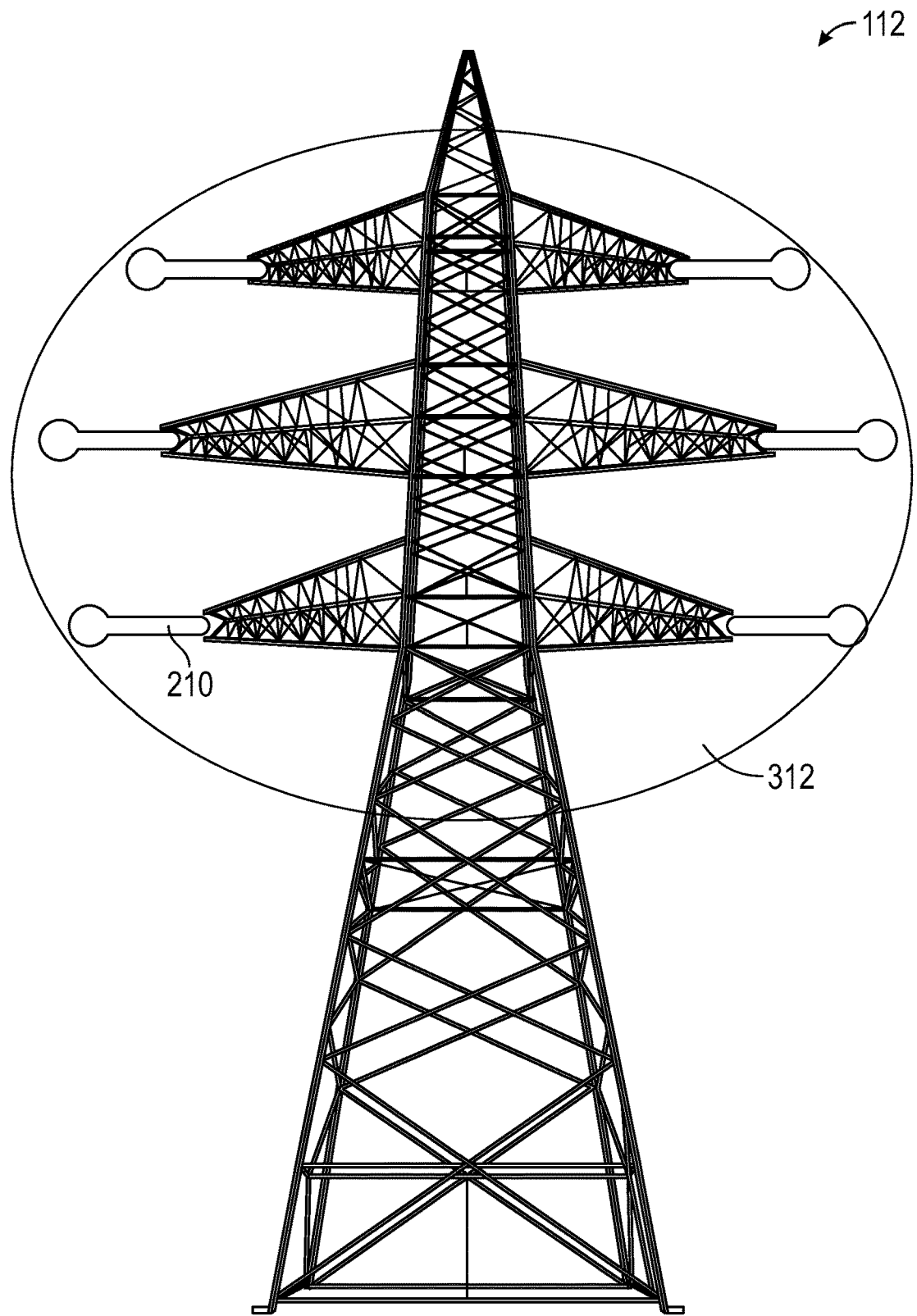
FIG. 3 depicts a field of view monitored by one or more sensors including one or more cameras and/or one or more light sensors according to some embodiments.

FIG. 3 depicts a field of view 312 monitored by one or more sensors 210 (e.g., one or more cameras and/or one or more light sensors) according to some embodiments. In some embodiments, the tower 112 comprises an array of sensors 210 that form a shield of coverage within the field of view 312 configured to detect intruding objects that penetrate the shield of coverage. In some embodiments, each sensor 210 may comprise a sensor support that distances the sensor away from the tower 112 at a predefined distance. For example, the predefined distance may be five feet according to some embodiments. In some embodiments, the use of a predefined distance creates particular radius, zone, or size of the shield of coverage that expands beyond the edges of the tower 112 at a predetermined distance away from one or more power lines. In some embodiments, by positioning the sensors 210 away from the tower 112 and one or more power lines, the sensors 210 are able to detect potential intrusion before actual intrusion and contact with the tower 112 and/or one or more power lines. In some embodiments, the system is configured to deenergize one or more power lines before contact occurs.

Figure 4:
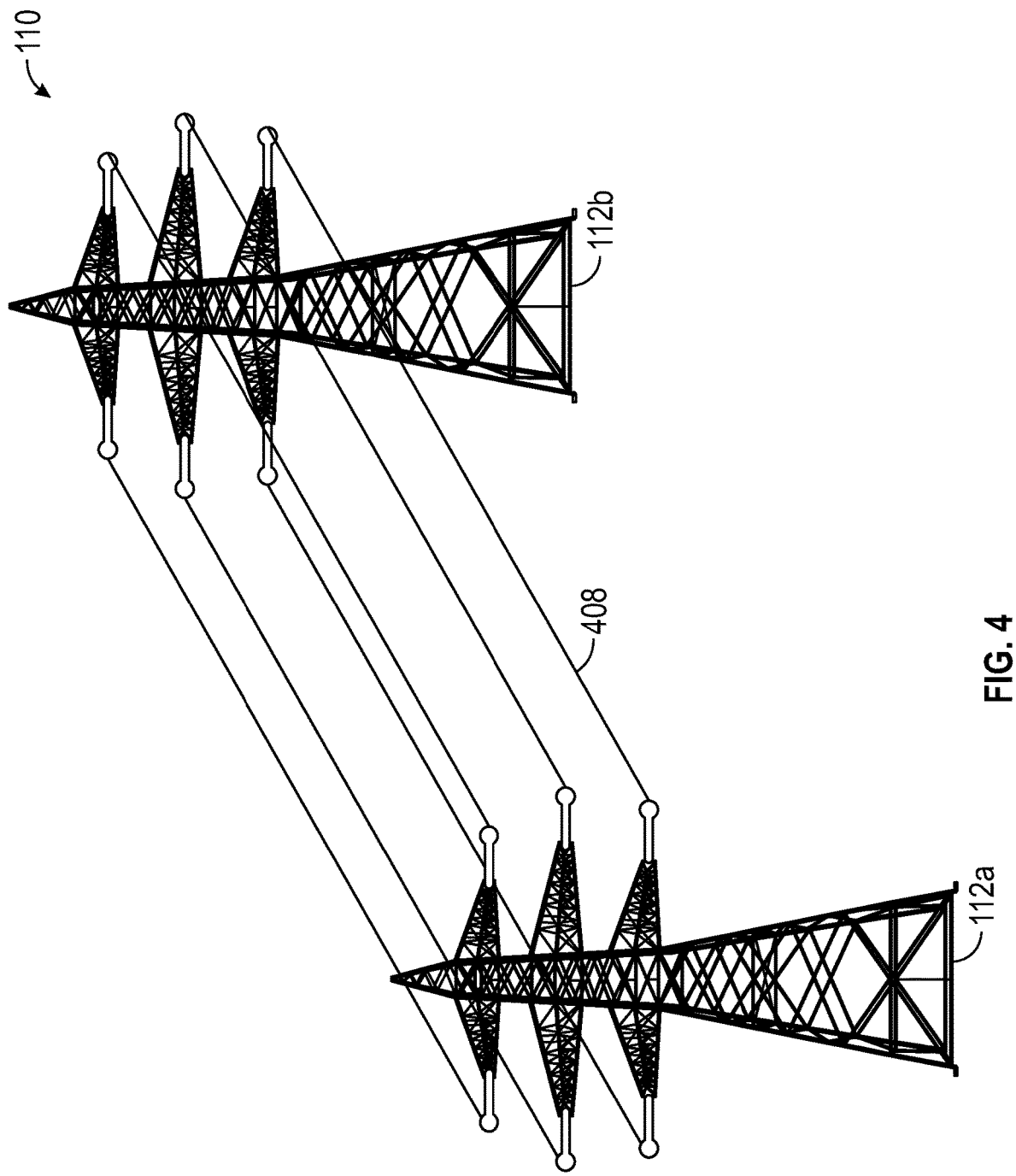
FIG. 4 illustrates one or more beams spanning between sensors on two utility structures according to some embodiments.

FIG. 4 illustrates one or more light beams 408 spanning between two utility structures 112*a,b*. In some embodiments, FIG. 4 depicts a first tower 112*a* and a second tower 112*b*. In some embodiments, the first tower 112*a* is within a line of sight with respect to the second tower 112*b*. In some embodiments, a sensor installed on the first tower 112*a* is configured to emit a beam 408 that is received by one or more corresponding sensor installed on the second tower 112*b*. For example, each sensor is configured to emit and/or receive an electromagnetic signal that forms a beam 408 according to some embodiments. In some embodiments, when a beam 408 is interrupted or otherwise broken, a sensor that receives and/or emits the beam 408 is configured to generate a signal indicating that the beam has been interrupted. The use of several sensors positioned along an outer periphery of a tower 112 creates a three-dimensional shield of coverage to detect proximate objects according to some embodiments.

Figure 5A:
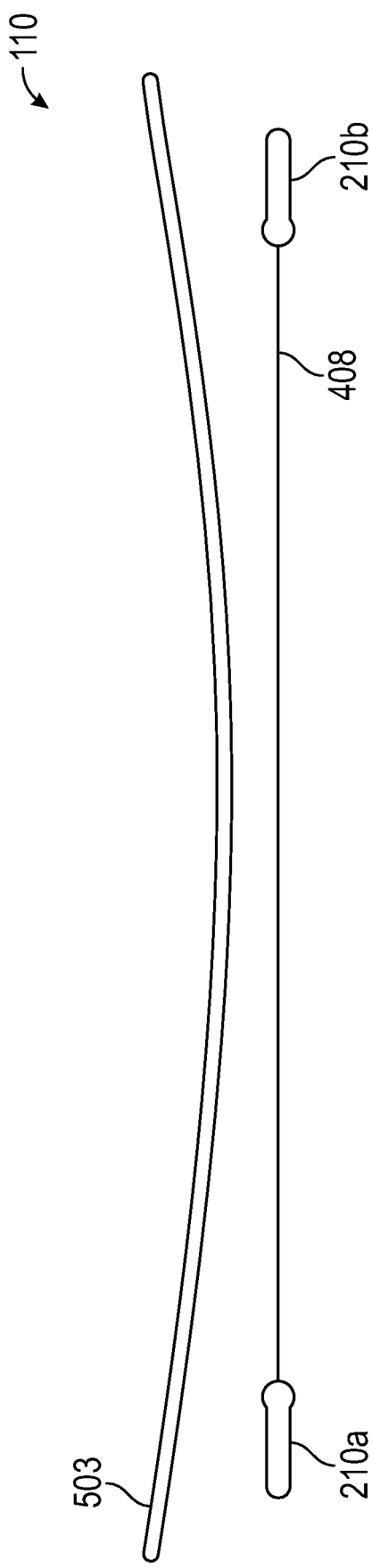
FIGS. 5A and 5B are drawings of detecting a defective power line in the operating environment according to various embodiments.
Figure 5B:
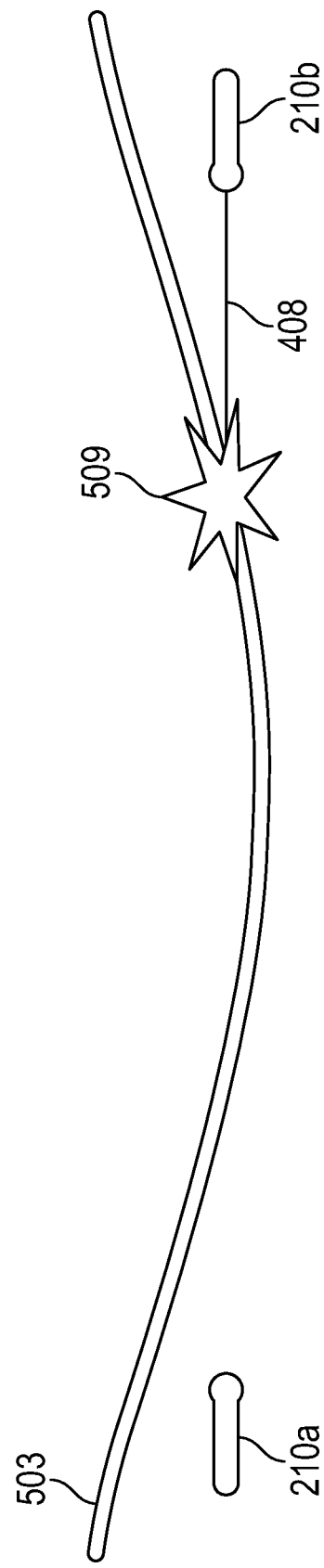

FIGS. 5A and 5B are drawings of detecting a defective power line in the operating environment according to various embodiments. FIG. 5A depicts a first sensor 210*a* and a second sensor 210*b* according to some embodiments. In some embodiments, the first sensor 210*a* and second sensor 210*b* are configured to be installed on the same tower 112 or on towers 112 within a line of sight. In some embodiments, the first sensor 210*a* and second sensor 210*b* together form a beam 408. Also shown in FIG. 5A is a cable 503 which may be a jumper cable or power line according to some embodiments. In some embodiments, the cable 503 may have some natural sagging due to the tension of the cable 503. In some embodiments, the beam 408 is configured to detect whether objects such as the cable 503 have crossed a boundary defined by the beam 408. For example, the beam 408 may be part of a shield of coverage surrounding one or more towers 112 or power lines supported by towers 112 according to some embodiments.

In FIG. 5B, the cable 503 has sagged to the point where it crosses the beam 408 according to some embodiments. In some embodiments, this results in a break point 509 which may be described as a break point event along a line of site. For example, in some embodiments, the first sensor 210*a* no longer detects the beam 408 because the cable 503 has interrupted the line of sight. In response, the first sensor 210*a* is configured to generate a signal that is transmitted to the communication module 220 and then conveyed over the communication network 120 to the monitoring application 132 according to some embodiments.

In some embodiments, the signal resulting from a break point event is configured to be formatted as a message that is transmitted over the communication network 120 to the computing system 130. In some embodiments, the message may be a binary indication of whether the bream 408 is broken. In some embodiments, the message may include a timestamp of when the beam was broken. For example, the communication module 220 may insert a timestamp into the message prior to transmitting it over the network according to some embodiments. In some embodiments, the message is configured to include a sensor identifier or tower identifier so that the monitoring application can determine a location.

In some embodiments, the monitoring application 132 is configured to generate an alert and transmit the alert to one or more predefined client devices 140. In some embodiments, the alert may be a push notification, text message, email, phone call, or other conventional electronic communication that is received at the client device 140. In some embodiments, the monitoring application 132 also is configured to generate an instruction to de-energize the tower 112 associated with the sensor 210. In some embodiments, each sensor is associated with a sensor identifier that is embedded into messages generated by the sensor. In some embodiments, the sensor identifier is used to determine a corresponding tower 112 that supports the sensor 210.

Figure 6:
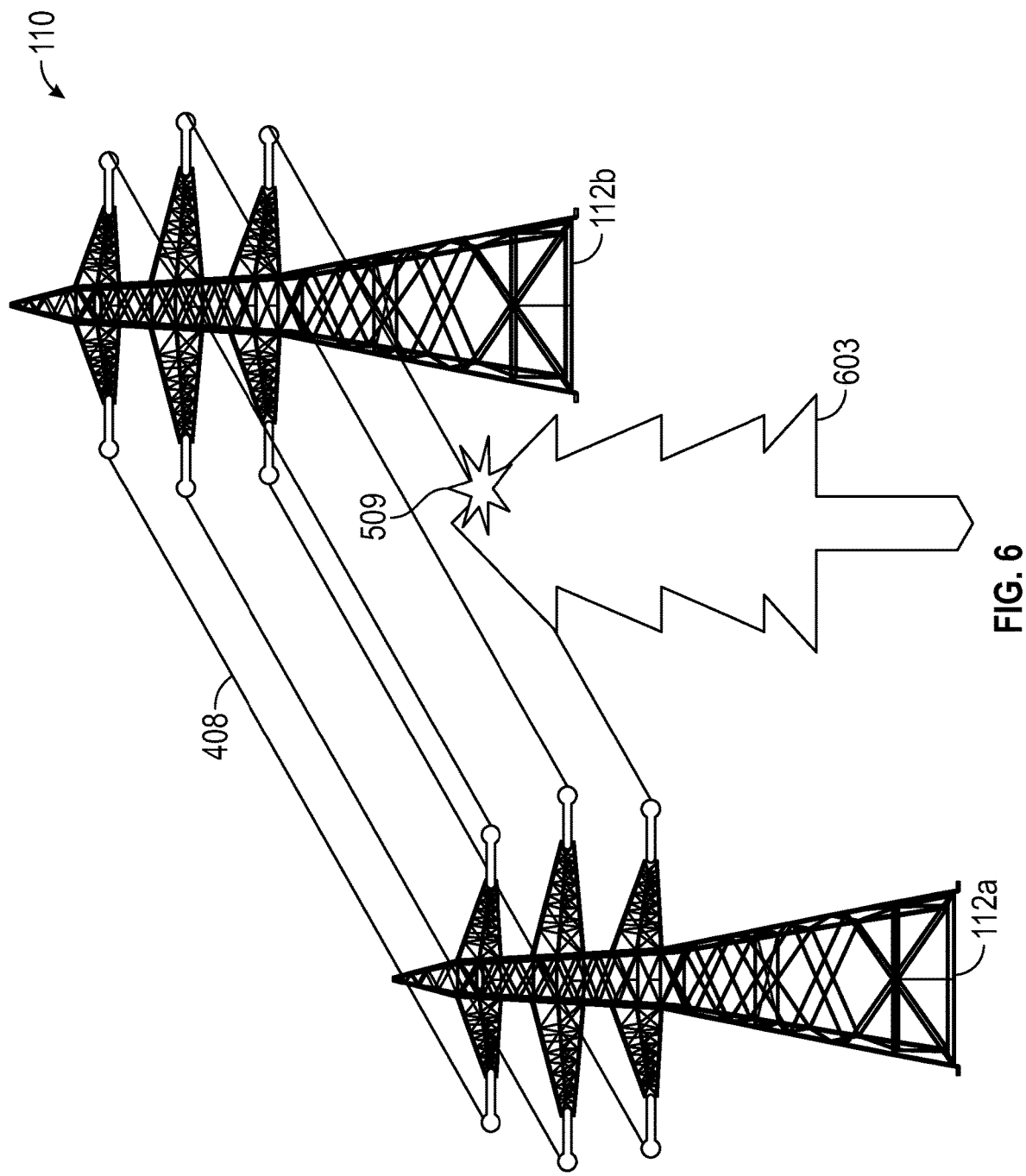
FIG. 6 depicts a hazard breaking a line of sight before impacting a power line according to some embodiments.

FIG. 6 depicts a hazard 603 breaking a line of sight 509 before impacting a power line 408 according to some embodiments. FIG. 6 depicts an example of overgrown vegetation 603 that encroaches a shield of coverage established by one or more beams 408 according to some embodiments. For example, in some embodiments the beams surround one or more power lines supported by a first tower 112*a* and second tower 112*b*. In some embodiments, the beams 408 are configured to detect when objects become proximate to the beams. In some embodiments, when the vegetation 603 grows too close to a power line, it may cross a beam, resulting in a break in the line of sight 509.

Although FIG. 6 shows the detection of overgrown vegetation 603, the sensors may be configured to detect other proximate objects such as, for example, downed cables, broken sensors, broken switches, large birds, fires, smoke, and other potentially damaging conditions according to some embodiments. In some embodiments, by detecting proximate objects before they come in contact, a monitoring application 132 may take preemptive measures such as automatically generating notifications to client devices 140 associated with personnel, de-energizing specific power lines carried by towers 112 endangered by proximate objects, and providing a camera feed to client devices 140 to assess other remedial steps.

Figure 7:
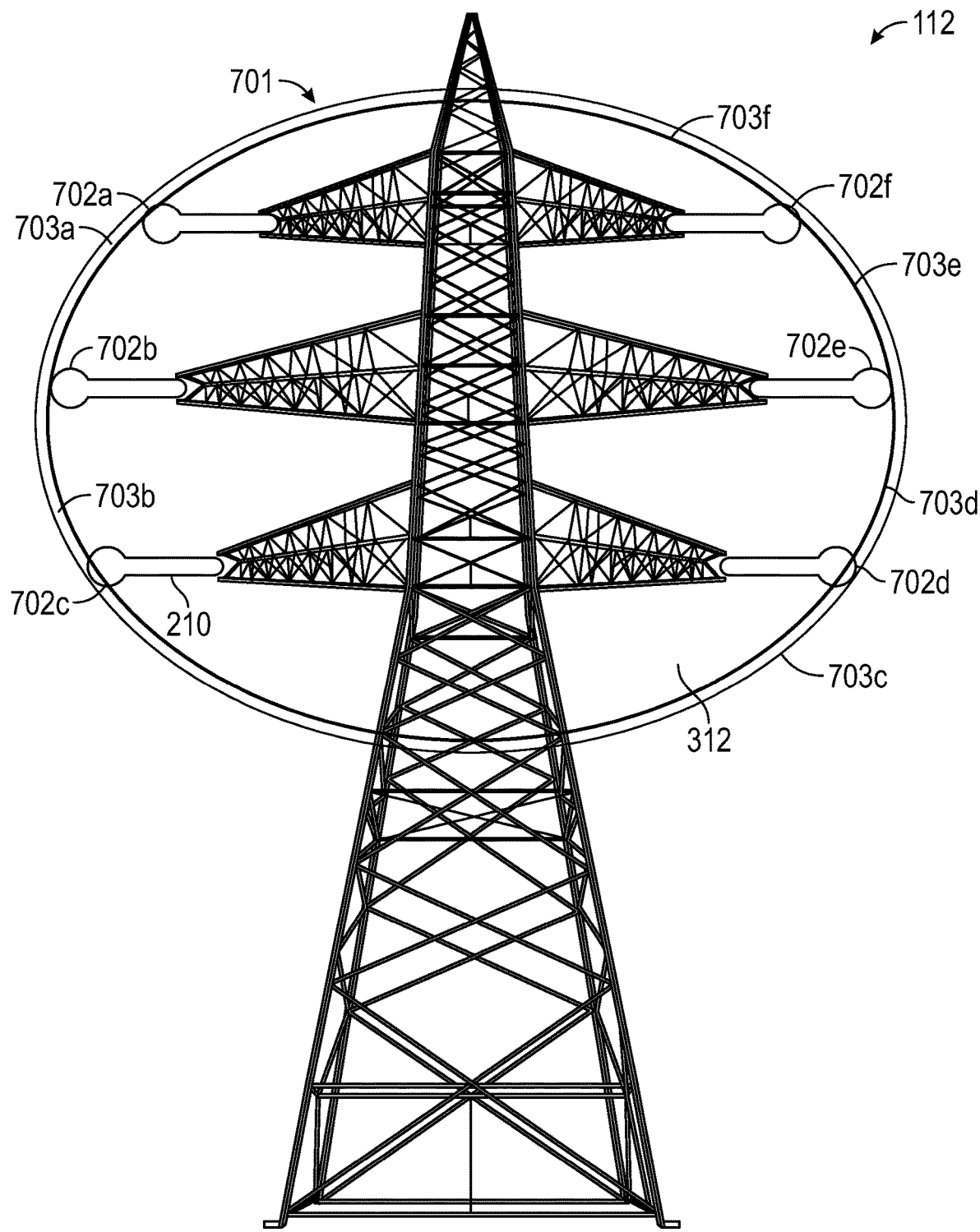
FIG. 7 shows a tower that includes a continuous structure that includes the one or more sensors defining a perimeter around at least a portion of the tower according to some embodiments.

FIG. 7 shows a tower 112 including a continuous sensor system 701. In some embodiments, continuous sensor system 701 is a continuous structure defining a perimeter around at least a portion of the tower 112. In some embodiments the continuous structure is a single continuous material (e.g., reflective tape) In some embodiments, continuous sensor system 701 includes a plurality of sensor sections 703*a-f* connected at nodes 702*a-f*. In some embodiments, nodes 702*a-f* include one or more sensors. In some embodiments, each of the plurality of sensor sections 703*a-f* includes a plurality of perimeter sensors. In some embodiments, the plurality of perimeter sensors are configured to collectively create a sensor curtain (e.g., a light curtain) to detect a hazardous condition occurring between nodes 702*a-f*.

Figure 8:
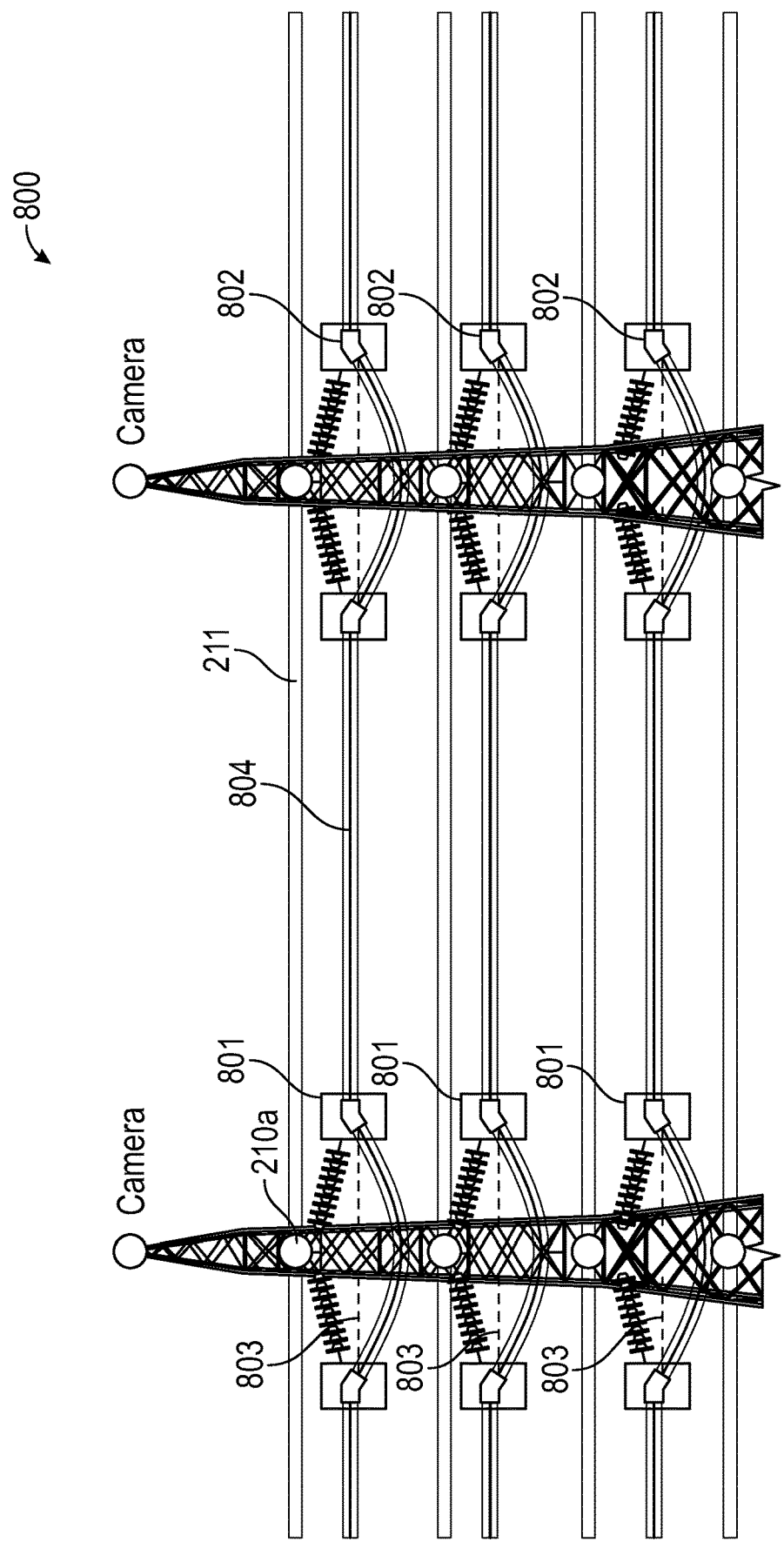
FIG. 8 shows a jumper cable failure detection portion of the system according to some embodiments.

FIG. 8 shows a jumper cable failure detection portion of the system 800 according to some embodiments. In some embodiments, the cable failure detection system 800 includes one or more fire boxes 801. In some embodiments, the cable failure detection system includes one or more arc sensors 802. In some embodiments, the cable failure detection system includes one or more fiber optic cables 803. In some embodiments, the cable failure detection system encloses the jumper cable 805 with the fire box 801 to minimize the impact of arcs/sparks from a failed jumper cable 805 connecting high voltage wires 804 into the surrounding environment. In some embodiments, each fire box 801 includes one or more arc sensors 802 which detects an arc and provides an alert signal to the system. In some embodiments, the one or more fiber optic cables 803 deliver the alert signal to the system. In some embodiments, the system uses one or more conventional signal transmitters (e.g., wireless, radio, etc.) to deliver the alert signal. In some embodiments, the cable failure detection system includes one or more sensors (e.g., 210*a*) configured to detect an object passing between a line of sight 211.

In some embodiments, when a PSPS is instituted, the monitoring application may verify whether a sensor data indicates a clear path before re-energizing the power lines. In some embodiments, the system is configured to re-energize a power line if there is no break point event detected for a predetermined period of time.

Some embodiments include the ability to de-energize a power line before an impact or failure can cause a power line to contact another object or the ground. In some embodiments, planar laser beams form a shield around the power lines. In some embodiments, these beams can be located wherever a utility or regulatory authority deems appropriate. In some embodiments, each of the planar beams are placed at a distance of 3-10 feet from each power line. In some embodiments, each of the planar beams are placed at a distance of 5 feet from each power line. In some embodiments, a predetermined distance provides some embodiments sufficient time to de-energize the power line within ten or more milliseconds to prevent undesirable contact with the damaged or otherwise compromised power line by a moving object. In some embodiments, grid stabilization can quickly take place through either automated or manual intervention. In some embodiments, two or more sensors must be triggered in order to cause of the power line to deenergize. In some embodiments, the monitoring application 132 is configured according to one or more rules to provide remediation. In some embodiments, the monitoring application 132 generates an instruction to de-energize a power line associated with one or more towers 112 in response to a break point event. In some embodiments, the monitoring application 132 is configured to generate and transmit a notification to a predefined recipient in response to a break point event. In some embodiments, the monitoring application 132 records and stores camera data in response to a break point event. In some embodiments, the monitoring application 132 is configured to forward real-time camera data to a client device 140 in response to a break point event.

In some embodiments, the system includes a fire detection system. In some embodiments, the fire detection system comprises one or more heat sensors. In some embodiments, a heat sensor is one or more of a thermal imaging camera, infrared camera, a negative temperature coefficient (NTC) thermistor, resistance temperature detector (RTD), thermocouple, and semiconductor-based sensor. In some embodiments, the system includes one or more heat sensors attached to a tower 112 in a predetermined location. In some embodiments, a predetermined location is at the base of the tower 112. In some embodiments, a predetermined location is adjacent one or more power lines (e.g., within 10 ft). In some embodiments, one or more sensors 210 include one or more heat sensors.

Figure 9:
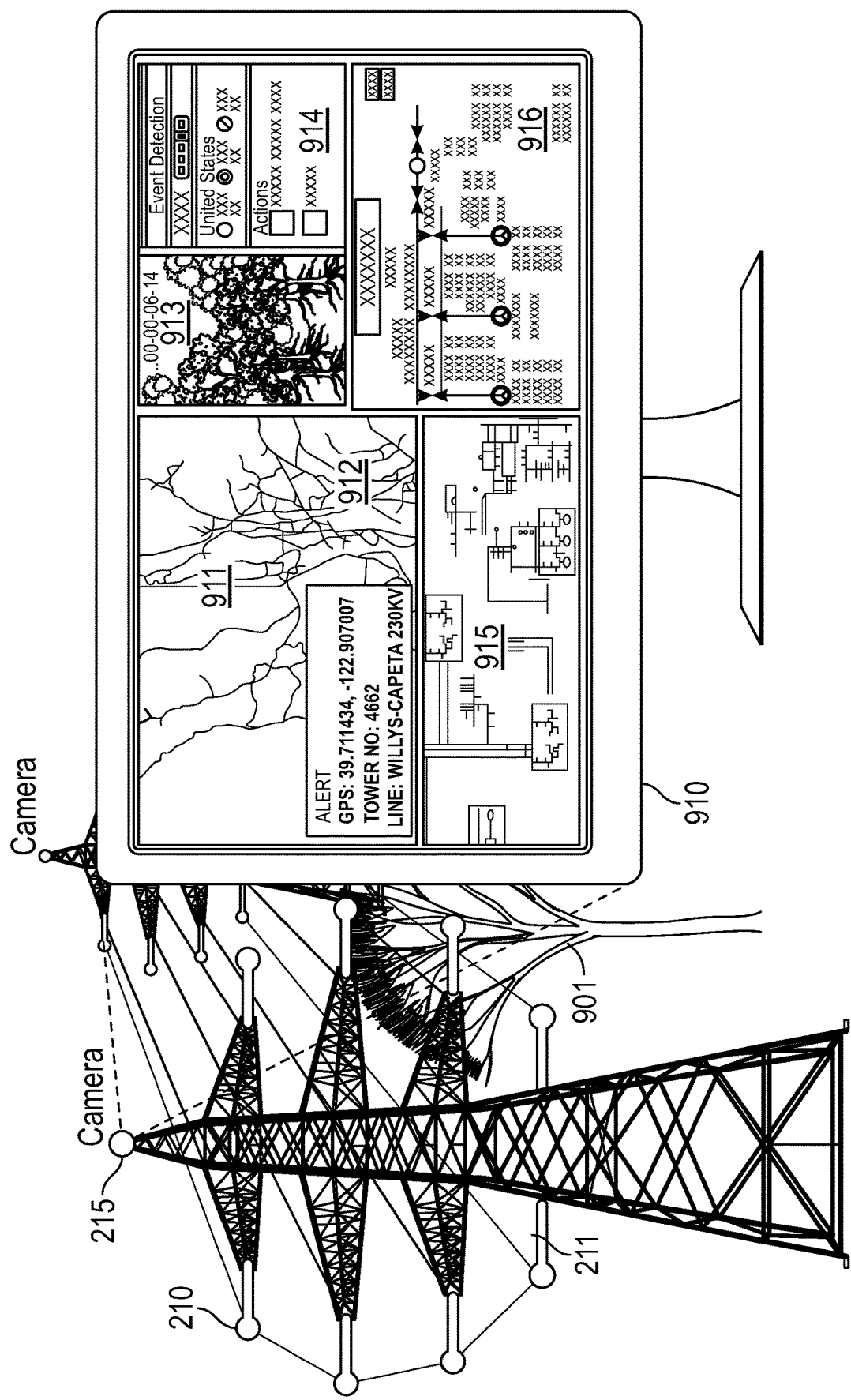
FIG. 9 illustrates a command center display portion of the system according to some embodiments.

FIG. 9 illustrates a command center display portion of the system according to some embodiments. In some embodiments, when a hazard (e.g., tree branch 901) breaches a line of sight 211 monitored by one or more sensors 211, 215, one or more signals are sent to a remote command center display 910. In some embodiments, the remote command center display is configured to display one or more of: a map 911 showing the location of the hazard, coordinates 912 of the hazard, a picture 913 of the hazard, a response planning window 914, structural and/or electrical drawings 915, and power plant operations panel 916, as non-limiting examples.

Figure 10:
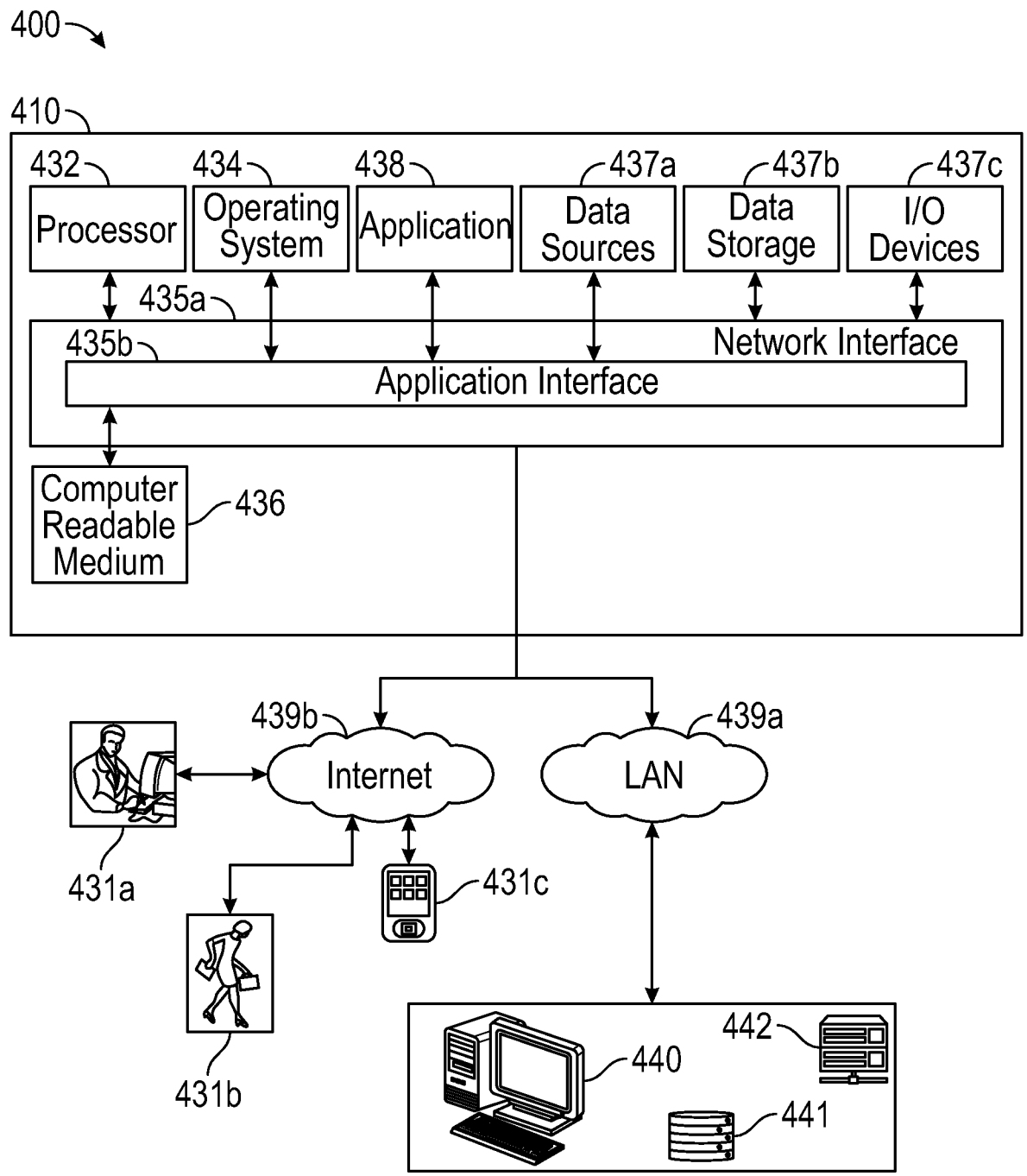
FIG. 10 illustrates a computer system enabling or comprising the systems and methods in accordance with some embodiments of the system.

FIG. 10 illustrates a computer system 410 enabling or comprising the systems and methods in accordance with some embodiments of the system. In some embodiments, the computer system 410 can operate and/or process computer-executable code of one or more software modules of the aforementioned system and method. Further, in some embodiments, the computer system 410 can operate and/or display information within one or more graphical user interfaces (e.g., HMIs) integrated with or coupled to the system.

In some embodiments, the computer system 410 can comprise at least one processor 434. In some embodiments, the at least one processor 434 can reside in, or coupled to, one or more conventional server platforms (not shown). In some embodiments, the computer system 410 can include a network interface 435a and an application interface 435b coupled to the least one processor 434 capable of processing at least one operating system 434. Further, in some embodiments, the interfaces 435a, 435b coupled to at least one processor 434 can be configured to process one or more of the software modules (e.g., such as enterprise applications 438). In some embodiments, the software application modules 438 can include server-based software, and can operate to host at least one user account and/or at least one client account, and operate to transfer data between one or more of these accounts using the at least one processor 434.

With the above embodiments in mind, it is understood that the system can employ various computer-implemented operations involving data stored in computer systems. Moreover, the above-described databases and models described throughout this disclosure can store analytical models and other data on computer-readable storage media within the computer system 410 and on computer-readable storage media coupled to the computer system 410 according to various embodiments. In addition, in some embodiments, the above-described applications of the system can be stored on computer-readable storage media within the computer system 410 and on computer-readable storage media coupled to the computer system 410. In some embodiments, these operations are those requiring physical manipulation of physical quantities. Usually, though not necessarily, in some embodiments these quantities take the form of one or more of electrical, electromagnetic, magnetic, optical, or magneto-optical signals capable of being stored, transferred, combined, compared and otherwise manipulated. In some embodiments, the computer system 410 can comprise at least one computer readable medium 436 coupled to at least one of at least one data source 437a, at least one data storage 437b, and/or at least one input/output 437c. In some embodiments, the computer system 410 can be embodied as computer readable code on a computer readable medium 436. In some embodiments, the computer readable medium 436 can be any data storage that can store data, which can thereafter be read by a computer (such as computer 440). In some embodiments, the computer readable medium 436 can be any physical or material medium that can be used to tangibly store the desired information or data or instructions and which can be accessed by a computer 440 or processor 434. In some embodiments, the computer readable medium 436 can include hard drives, network attached storage (NAS), read-only memory, random-access memory, FLASH based memory, CD-ROMs, CD-Rs, CD-RWs, DVDs, magnetic tapes, other optical and non-optical data storage. In some embodiments, various other forms of computer-readable media 436 can transmit or carry instructions to a remote computer 440 and/or at least one user 431, including a router, private or public network, or other transmission or channel, both wired and wireless. In some embodiments, the software application modules 438 can be configured to send and receive data from a database (e.g., from a computer readable medium 436 including data sources 437a and data storage 437b that can comprise a database), and data can be received by the software application modules 438 from at least one other source. In some embodiments, at least one of the software application modules 438 can be configured within the computer system 410 to output data to at least one user 431 via at least one graphical user interface rendered on at least one digital display.

In some embodiments, the computer readable medium 436 can be distributed over a conventional computer network via the network interface 435a where the system embodied by the computer readable code can be stored and executed in a distributed fashion. For example, in some embodiments, one or more components of the computer system 410 can be coupled to send and/or receive data through a local area network ("LAN") 439a and/or an internet coupled network 439b (e.g., such as a wireless internet). In some embodiments, the networks 439a, 439b can include wide area networks ("WAN"), direct connections (e.g., through a universal serial bus port), or other forms of computer-readable media 436, or any combination thereof.

In some embodiments, components of the networks 439a, 439b can include any number of personal computers 440 which include for example desktop computers, and/or laptop computers, or any fixed, generally non-mobile internet appliances coupled through the LAN 439a. For example, some embodiments include one or more of personal computers 440, databases 441, and/or servers 444 coupled through the LAN 439a that can be configured for any type of user including an administrator. Some embodiments can include one or more personal computers 440 coupled through network 439b. In some embodiments, one or more components of the computer system 410 can be coupled to send or receive data through an internet network (e.g., such as network 439b). For example, some embodiments include at least one user 431a, 431b, is coupled wirelessly and accessing one or more software modules of the system including at least one enterprise application 438 via an input and output ("I/O") 437c. In some embodiments, the computer system 410 can enable at least one user 431a, 431b, to be coupled to access enterprise applications 438 via an I/O 437c through LAN 439a. In some embodiments, the user 431 can comprise a user 431a coupled to the computer system 410 using a desktop computer, and/or laptop computers, or any fixed, generally non-mobile internet appliances coupled through the internet 439b. In some embodiments, the user can comprise a mobile user 431b coupled to the computer system 410. In some embodiments, the user 431b can connect using any mobile computing 431c to wireless coupled to the computer system 410, including, but not limited to, one or more personal digital assistants, at least one cellular phone, at least one mobile phone, at least one smart phone, at least one pager, at least one digital tablets, and/or at least one fixed or mobile internet appliances.

The subject matter described herein are directed to technological improvements to the field of environmental protection by improving hazardous condition monitoring of remote utility structures. The disclosure describes the specifics of how a machine including one or more computers comprising one or more processors and one or more non-transitory computer implement the system and its improvements over the prior art. The instructions executed by the machine cannot be performed in the human mind or derived by a human using a pin and paper but require the machine to convert process input data to useful output data. Moreover, the claims presented herein do not attempt to tie-up a judicial exception with known conventional steps implemented by a general-purpose computer; nor do they attempt to tie-up a judicial exception by simply linking it to a technological field. Indeed, the systems and methods described herein were unknown and/or not present in the public domain at the time of filing, and they provide a technologic improvements advantages not known in the prior art. Furthermore, the system includes unconventional steps that confine the claim to a useful application.

It is understood that the system is not limited in its application to the details of construction and the arrangement of components set forth in the previous description or illustrated in the drawings. The system and methods disclosed herein fall within the scope of numerous embodiments. The previous discussion is presented to enable a person skilled in the art to make and use embodiments of the system. Any portion of the structures and/or principles included in some embodiments can be applied to any and/or all embodiments: it is understood that features from some embodiments presented herein are combinable with other features according to some other embodiments. Thus, some embodiments of the system are not intended to be limited to what is illustrated but are to be accorded the widest scope consistent with all principles and features disclosed herein.

Some embodiments of the system are presented with specific values and/or setpoints. These values and setpoints are not intended to be limiting and are merely examples of a higher configuration versus a lower configuration and are intended as an aid for those of ordinary skill to make and use the system.

Furthermore, acting as Applicant's own lexicographer, Applicant imparts the additional meaning to the following terms:

"Substantially" and "approximately" when used in conjunction with a value encompass a difference of 5% or less of the same unit and/or scale of that being measured. In some embodiments, "substantially" and "approximately" are defined as presented in the specification in accordance with some embodiments.

"Simultaneously" as used herein includes lag and/or latency times associated with a conventional and/or proprietary computer, such as processors and/or networks described herein attempting to process multiple types of data at the same time. "Simultaneously" also includes the time it takes for digital signals to transfer from one physical location to another, be it over a wireless and/or wired network, and/or within processor circuitry.

The use of and/or, in terms of "A and/or B," means one option could be "A and B" and another option could be "A or B." Such an interpretation is consistent with the USPTO Patent Trial and Appeals Board ruling in ex parte Gross, where the Board established that "and/or" means element A alone, element B alone, or elements A and B together.

As used herein, some embodiments recited with term "can" or "may" or derivations there of (e.g., the system display can show X) is for descriptive purposes only and is understood to be synonymous with "configured to" (e.g., the system display is configured to show X) for defining the metes and bounds of the system.

The previous detailed description is to be read with reference to the figures, in which like elements in different figures have like reference numerals. The figures, which are not necessarily to scale, depict some embodiments and are not intended to limit the scope of embodiments of the system.

Any of the operations described herein that form part of the invention are useful machine operations. The invention also relates to a device or an apparatus for performing these operations. The apparatus can be specially constructed for the required purpose, such as a special purpose computer. When defined as a special purpose computer, the computer can also perform other processing, program execution or routines that are not part of the special purpose, while still being capable of operating for the special purpose. Alternatively, the operations can be processed by a general-purpose computer selectively activated or configured by one or more computer programs stored in the computer memory, cache, or obtained over a network. When data is obtained over a network the data can be processed by other computers on the network, e.g. a cloud of computing resources.

The embodiments of the invention can also be defined as a machine that transforms data from one state to another state. The data can represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, some embodiments include methods can be processed by one or more machines or processors that can be connected over a network. Each machine can transform data from one state or thing to another, and can also process data, save data to storage, transmit data over a network, display the result, or communicate the result to another machine. Computer-readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules or other data.

Although method operations are presented in a specific order according to some embodiments, the execution of those steps do not necessarily occur in the order listed unless a explicitly specified. Also, other housekeeping operations can be performed in between operations, operations can be adjusted so that they occur at slightly different times, and/or operations can be distributed in a system which allows the occurrence of the processing operations at various intervals associated with the processing, as long as the processing of the overlay operations are performed in the desired way and result in the desired system output.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A utility structure monitoring system including:
one or more sensors,
one or more utility power lines, and
one or more utility structures;
wherein the one or more sensors are configured to detect a hazard at a predetermined distance from the one or more utility power lines and generate a hazard signal;
wherein the utility structure monitoring system is configured to generate a hazard alert upon receiving the hazard signal generated by the one or more sensors;
wherein the one or more sensors includes one or more angle switches; and
wherein the one or more angle switches are configured to generate the hazard signal in response to the one or more utility structures shifting beyond a predetermined angle.

2. The utility structure monitoring system of claim 1, wherein the one or more sensors includes a laser sensor.

3. The utility structure monitoring system of claim 2, wherein the laser sensor includes one or more of a through-beam sensor, retro-reflective sensor, and a diffuse reflection sensor.

4. The utility structure monitoring system of claim 1, wherein the one or more sensors includes a photoelectric sensor.

5. The utility structure monitoring system of claim 1, wherein the one or more sensors includes one or more light emitting elements configured to transmit a light signal, and one or more light receiving elements each configured to receive the light signal from a respective one of the one or more light emitting elements;
wherein each of the one or more light receiving elements receives the light signal from respective one of the one or more light emitting element along a line of site; and
wherein the utility structure monitoring system is configured to generate the hazard alert in response to an object breaking the line of sight.

6. The utility structure monitoring system of claim 1, wherein the one or more sensors includes one or more cameras; and
wherein the utility structure monitoring system is configured to generate a hazard alert upon detecting one or more moving objects within a field of view at least one of the one or more cameras.

7. The utility structure monitoring system of claim 6, wherein the one or more cameras include one or more thermal cameras; and
wherein the utility structure monitoring system is configured to generate an alert upon detecting a temperature above a predetermined limit using the one or more thermal cameras.

8. The utility structure monitoring system of claim 1, wherein the one or more sensors includes one or more thermocouples; and
wherein the utility structure monitoring system is configured to generate an alert upon detecting a temperature above a predetermined limit using the one or more thermocouples.

9. A utility structure monitoring system including:
one or more sensors,
one or more utility power lines configured to conduct more than 1000 volts of electricity,
one or more utility structures configured to suspend the one or more utility power lines at a predetermined vertical distance from a ground base of the one or more utility structures, and
a fire box;
wherein the one or more sensors are configured to detect a hazard to the one or more utility power lines and generate a hazard signal;
wherein the utility structure monitoring system is configured to generate a hazard alert action upon receiving the hazard signal generated by the one or more sensors;
wherein the one or more sensors includes an arc sensor configured to generate the hazard signal in response to an arc emanating from the one or more utility power lines; and
where the fire box is configured to prevent a fire by containing the arc emanating from the one or more utility power lines.

10. The utility structure monitoring system of claim 9, wherein the hazard includes one or more of a utility structure shift, a line of sight break, an electrical arc, and a fire.

11. A utility structure monitoring system including:
one or more sensors,
one or more utility power lines configured to conduct more than 1000 volts of electricity, and one or more utility structures configured to suspend the one or more utility power lines at a predetermined vertical distance from a ground base of the one or more utility structures;

wherein the one or more sensors are configured to detect a hazard to the one or more utility power lines and generate a hazard signal;

wherein the utility structure monitoring system is configured to generate a hazard alert action upon receiving the hazard signal generated by the one or more sensors;

wherein the one or more sensors includes one or more light emitting elements and one or more light receiving elements;

wherein the one or more light receiving elements are each configured to receive a light signal from a respective one of the one or more light emitting elements along a line of site; and wherein the utility structure monitoring system is configured to generate the hazard alert action in response to an object passing between the one or more light receiving elements and respective one of the one or more light emitting elements thereby breaking the respective line of site; and wherein the one or more light emitting elements and one or more light receiving elements are each positioned such that the line of sight extends at a predetermined distance away from the one or more utility power lines.

12. The utility structure monitoring system of claim 11, wherein the one or more sensors includes one or more cameras; and wherein the utility structure monitoring system is configured to generate the hazard alert action upon detecting the object within a field of view at least one of the one or more cameras and/or upon detecting a fire within a field of view at least one of the one or more cameras.

13. The utility structure monitoring system of claim 12, wherein the one or more sensors includes one or more angle switches configured to generate the hazard signal in response to the one or more utility structures shifting beyond a predetermined angle.

14. The utility structure monitoring system of claim 13, wherein the one or more sensors includes one or more disconnect switches;

wherein the one or more disconnect switches are configured to generate a hazard signal upon at least a portion of an insulator, an insulator hook, and/or the one or more power lines moving from a fixed position on the one or more utility structures; and wherein moving from a fixed position causes at least a portion of the one or more disconnect switches to electrically decouple from a sensor connection.

15. The utility structure monitoring system of claim 11, wherein the hazard alert action includes electrically isolating the one or more power lines in response to the hazard signal before the object strikes the one or more utility structures and/or the one or more power lines.

* * * * *